United States Patent [19]

Pease et al.

[11] Patent Number: 4,997,523

[45] Date of Patent: Mar. 5, 1991

[54] METHOD FOR EFFECTIVELY BREAKING UP LATEX-COATED PAPER DURING PULPING TO DECREASE THE POTENTIAL FOR WHITE PITCH DEPOSITION

[75] Inventors: Jacqueline K. Pease, Jacksonville, Fla.; Catherine S. Dixon, St. Mary's, Ga.; Daniel L. Michalopoulos, Jacksonville, Fla.

[73] Assignee: Betz PanerChem, Inc., Jacksonville, Fla.

[21] Appl. No.: 541,240

[22] Filed: Jun. 20, 1990

[51] Int. Cl.$^5$ .................... D21C 9/08; D21H 21/02
[52] U.S. Cl. ............................ 162/5; 162/191; 162/199; 162/DIG. 4
[58] Field of Search .................. 162/DIG. 4, DIG. 3, 162/199, 4, 5, 158

[56] References Cited

U.S. PATENT DOCUMENTS

| | | | |
|---|---|---|---|
| 3,748,220 | 7/1973 | Gard | 162/DIG. 4 |
| 3,808,089 | 4/1974 | Von Koeppen et al. | 162/5 |
| 4,056,430 | 11/1977 | Hoeger et al. | 162/DIG. 4 |
| 4,643,800 | 2/1987 | Maloney et al. | 162/5 |
| 4,735,682 | 4/1988 | Didwania et al. | 162/8 |
| 4,861,429 | 8/1989 | Barnett | 162/199 |

Primary Examiner—Karen M. Hastings
Assistant Examiner—Brenda Lamb
Attorney, Agent, or Firm—Alexander D. Ricci; Gregory M. Hill

[57] ABSTRACT

A composition and method for inhibiting the deposition of white pitch on the surfaces of papermaking equipment during the processing of recycled coated broke. The process involves adding to the coated broke during repulping a composition having a first compound of a tetrafunctional alkoxylated diamine having the structure:

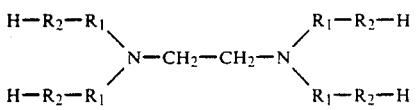

wherein $R_1$ and $R_2$ are ethylene oxide or propylene oxide and $R_1$ and $R_2$ are not the same, and a second compound selected from the group consisting of a phosphate, phosphonate and phosphonic acid.

9 Claims, No Drawings

METHOD FOR EFFECTIVELY BREAKING UP LATEX-COATED PAPER DURING PULPING TO DECREASE THE POTENTIAL FOR WHITE PITCH DEPOSITION

FIELD OF THE INVENTION

The present invention relates to the paper processing industry and specifically addresses the problems caused by the generation of white pitch associated with the repulping of coated broke and other secondary fibers.

BACKGROUND OF THE INVENTION

The problem of white pitch deposition occurs when secondary or coated paper is recycled. The coating, which comprises latex, generally styrene butadiene (SBR) and/or polyvinyl acetate (PVAC), natural binders, such as starch, and inorganic pigments, forms deposits on the paper machine. These deposits, referred to as "white pitch", can be very costly as they cause sheet defects, such as holes and breaks in the web of paper, as well as requiring added time for equipment cleanup. In the wet-end of the paper machine, white pitch usually deposits on the foils, table rolls, vacuum boxes, uhle boxes and throughout the press felts. Dry-end deposits appear on the dryer cans and dryer felts as a hazy white buildup.

PRIOR ART

U.S. Patent No. 4,735,682, Didwania et al., teaches a process for recovering papermaking fibers from latex-bonded broke or paper containing latex. The method described subjects the broke to an aqueous alkaline solution having a sodium hydroxide concentration in the range of 0.5 to 5 mole percent. This addition was used to eliminate clumps of fibers after pulping so that tissue could be made from the recovered cellulose.

Another method for removing and dispersing contaminants from secondary fiber during repulping is taught by U.S. Pat. No. 4,643,800, Maloney, et al. This method utilizes an oxyethylene glycol nonionic surfactant in which one end hydroxyl group has been substituted with an aliphatic or alkylaromatic group and the other end hydroxyl group has been replaced with a polyoxypropylene group or a benzyl ether group. The nonionic surfactant is added in combination with a low molecular weight (500–50,000) polyelectrolyte dispersant.

U.S. Pat. No. 3,808,089, Von Koeppen et al., teaches a method for reuse of printed and coated paper as top liner. The method described utilizes a combination of an ethoxylated aliphatic alcohol emulsifier with an alkali metal phosphate salt or silicate salt. The preferred ethoxylated aliphatic alcohols in this method are secondary alcohol ethoxylates.

GENERAL DESCRIPTION OF THE INVENTION

The propensity for white pitch particles to deposit on paper-making equipment is related to the size of these particles. There is a direct link between white pitch deposition and the efficiency of breaking up larger coating particles into smaller ones during the repulping of recycled coated paper containing a latex coating.

We have observed the effect of a change in the efficiency of breaking up the latex coating during repulping at a paper mill manufacturing medium weight coated publication grade paper. Prior to a change made to their coating formulation the mill experienced no problems from white pitch deposition. The change caused a significant increase in the particle size of the undispersed coating which remained even after repulping the coated paper for recycling purposes. A severe white pitch outbreak occurred as a result.

It is the function of the repulper to mechanically break down the larger coating particles into smaller ones. However, variances in the latex coating formulations between different papers result in variations in the sizes of the coating components after similar mechanical repulping operations. Some coating formulations will exhibit small coating particle sizes after repulping, while others, such as in the above noted mill example, will exhibit large particles after repulping. In order to prevent white pitch deposition and white pitch related sheet defects after the repulping process, these large particles must be reduced in size. Since the mechanical repulping operation is incapable of performing this task in every case where white pitch deposition or sheet spots and defects related to white pitch are a problem, a chemical additive is needed.

DETAILED DESCRIPTION OF THE INVENTION

The present invention relates to a process for inhibiting the deposition of white pitch throughout a papermaking machine by breaking down the coating during repulping into smaller particles having a lower deposition potential. The process comprises adding to a repulper containing coated broke and water a combination of two chemical components. The first component is a tetrafunctional alkoxylated diamine having the following structure.

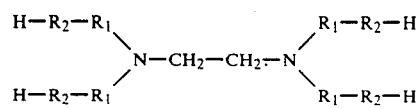

wherein $R_1$ and $R_2$ are ethylene oxide or propylene oxide and $R_1$ and $R_2$ are not the same. The ethylene oxide content in the molecule is from about 10% to about 80% by weight. This molecule is available under the commercial product name Tetronic from BASF Corporation. The second component is an anionic compound which contains a phosphate or phosphonate functionality. The two chemical components may be added to the repulper wherein the weight ratio of the tetrafunctional alkoxylated diamine to the phosphate or phosphonic acid and its salts is from about 1:4 to 4:1. The prefered ratio is about 1:1.

Since the processing of secondary fibers through a paper mill often results in the generation of problems and paper defects other than white pitch, it is expected that the present invention may be utilized in conjunction with items such as retention aids, conditioners and pitch control agents (when the coated broke is blended with virgin fiber).

Characteristic examples of the phosphate and phosphonic acid components are shown below:

$Na_5P_3O_{10}$: Sodium tripolyphosphate (STPP), FMC Corp., $(NaPO_3)_{21}$: glassy condensed phosphate (glass H) FMC Corp., amino trimethylene phosphonic acid (AMP), available from Monsanto Corp., as Dequest 2000

1-hydroxyethylidene 1,1-diphosphonic acid (HEDP), available from Monsanto Corp., as Dequest 2010 ethylene diamine tetramethylene phosphonic acid (EDTMP), available from Monsanto Corp., as Dequest 2041 poly isopropenyl phosphonic acid (PIPA), available from Betz Laboratories, Inc.

polyoxyethylene nonyl phenyl ether phosphate, available from GAF Corp., as Gafac RE610 polyoxyethylene octadecenyl ether phosphate, available from GAF Corp., as Gafac RB400.

EXAMPLES

The invention will now be further described with reference to a number of specific examples which are to be regarded solely as illustrative and not as restricting the scope of the invention.

EXAMPLE 1

Coated publication grade paper from a northern paper company referred to as "Coated Paper #1" was used for the first study. This coated paper, which is produced in an alkaline environment, has an organic extractables content of 0.6%. The major extractable components are SBR and fatty acids, with a minor component which is an organic ester. Coated Paper #1 was pulped in a laboratory repulper at 5% consistency (percent filterable solids in water) in deionized water for 30 minutes at 100° F. and 1000 rpm; 5 minutes were allowed for warm-up to 100° F. prior to pulping. The desired chemical treatments were added directly to the pulper prior to warm-up. These treatments are listed as a percentage by weight of the total pulper contents. After repulping, the coated broke was diluted to 0.5% consistency and 3 to 4 microscope slides were made. The slides were evaluated for particles of undispersed coating which are easily distinguished from papermaking fiber. The particles were measured with an eyepiece micrometer scale which had been standardized to measure particles from 10 to 500 microns at 100 x. Three passes were made across each slide and the particles were counted which fell within the following ranges: 100–200, 200–300, and greater than 300 microns. Particles less than 100 microns were not counted due to their relatively high number. The percent of the counted particles (those greater than 100 microns) which fell into each category was calculated and the average of the 3 to 4 slides was determined. Total value equals 100% +2% due to overlap in computed averages. The results of this evaluation with no chemical additives are shown in Table I.

TABLE I

| | Coated Paper #1 Percent of Particles Greater than 100 Microns | | |
|---|---|---|---|
| | 100–200 | 200–300 | 300 MICRONS AND GREATER |
| No Additives | 80% | 18% | 2% |

With no additive, 20% of the counted particles of undispersed coating were larger than 200 microns. Particles this large are easily seen with the naked eye; appearing similar in size to sand granules. The results in Table III were obtained for Coated Paper #1 when pulped in a conventional laboratory pulper, similar to a commercial papermill repulper with $Na_5P_3O_{10}$ (sodium tripolyphosphate) and a tetrafunctional diamine, added either separately or in combination.

Table II defines and labels the tetrafunctional diamines which were utilized in the analysis of the invention and which are shown in the results provided herein.

TABLE II

Tetrafunctional Diamines

Example A1

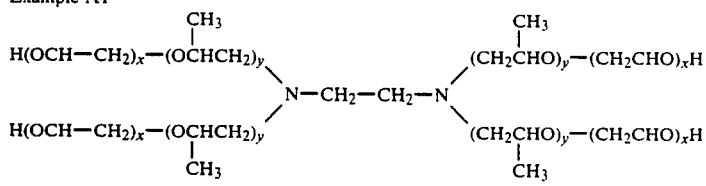

with 10% by weight of x, ethylene oxide.
Example A2
same as formula in A1, except with 20% by weight of x, ethylene oxide.
Example A3
same as formula in A1, except with 40% by weight of x, ethylene oxide.
Example A4
same as formula in A3, except having a higher molecular weight.
Example A5
same as formula in A1, except with 80% by weight of x, ethylene oxide.
Example B1

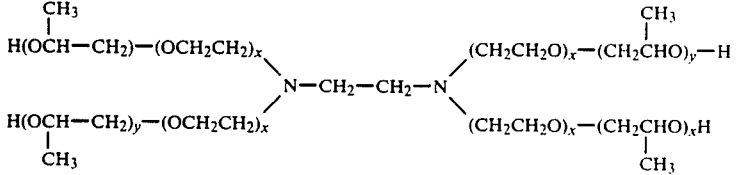

with 40% by weight of x, ethylene oxide.
Example B2
same as formula in B1, except with 10% by weight of x, ethylene oxide.
Example B3
same as formula in B1, except with 20% by weight of x, ethylene oxide.

TABLE III

Tetrafunctional diamine/phosphate efficacy

| Composition | Concentration Percent by weight | Particle Size After Treatment (Microns) | | |
|---|---|---|---|---|
| | | 100-200 | 200-300 | 300+ |
| Na₅P₃O₁₀ & Example A1 | .025 .025 | 98% | 2% | 0 |
| Example A1 | .05 | 93% | 7% | 0 |
| Na₅P₃O₁₀ | .05 | 88% | 12% | 0 |

A test was performed to determine the likelihood that the broke will stick to papermaking equipment surfaces, such as the dryer can, and cause deposition related problems. Paper sheets were made using a conventional Noble and Wood sheet mold from pulped Coated Paper #1. Foil was attached and dried to the sheets and the force required to peel the foil from the paper was measured. The higher the amount of peel strength the more likely the broke will stick to the dryer can. These data measuring increasing dosage levels are shown in Table IV.

TABLE IV

Peel Strength

| Composition | Concentration Percent by Weight | Peel strength (g/cm width) |
|---|---|---|
| No Additives | | 30.0 |
| Na₅P₃O₁₀ & Example A1 | .0125 .0125 | 25.8 |
| Na₅P₃O₁₀ & Example A1 | .025 .025 | 24.5 |
| Na₅P₃O₁₀ & Example A1 | .05 .05 | 23.9 |

These results correspond with the field and laboratory data shown in Tables I and III. It was observed that as the percent of larger coating particles was reduced by the additives of the present invention, the deposition potential of the paper made with the recycled coated broke decreased.

Other phosphates were tested for their efficacies when combined with the tetrafunctional diamine, Example A1. Results were obtained in accordance with the laboratory test procedure defined hereinabove and are shown in Table V.

TABLE V

Alternate phosphates/tetrafunctional diamine efficacy

| Composition | Concentration percent by weight | Particle Size After Treatment (Microns) | | |
|---|---|---|---|---|
| | | 100-200 | 200-300 | 300+ |
| NaH₂PO₄ & Example A1 | .025 .025 | 97% | 3% | 0% |
| NaH₂PO₄ | .05 | 84 | 16 | 0 |
| (NaPO₃)₂₁ & Example A1 | .025 .025 | 99% | 1% | 0 |
| (NaPO₃)₂₁ | .05 | 85 | 15 | 0 |

The above results indicate that other phosphates may be successfully combined with the tetrafunctional diamine to produce an effective additive for reducing particle size. It also appears that the higher the molecular weight the better the results as the larger molecular weight compound (NaPO₃)₂₁ combined with the tetrafunctional diamine to yield only 1% of particles being 200 microns or greater in size. Accordingly, other phosphates may be effectively utilized with the tetrafunctional diamine. These include orthophosphates such as monopotassium phosphate, polyphosphates such as tetrapotassium pyrophosphate and glassy phosphates such as hexametaphosphate.

Other tetrafunctional diamines, differing from each other in relative amounts of ethylene oxide, were pulped with Coated Paper #1 in combination with Na₅P₃O₁₀. Due to lack of experimental significance, where the combination selected showed little or no beneficial effect, that particular tetrafunctional diamine was not pulped at an equal dosage level independently. These results are shown in Table VI.

TABLE VI

Alternate tetrafunctional diamines/Na₅P₃O₁₀ efficacies

| Composition | Concentration Percent by weight | Particle Size (Microns) | | |
|---|---|---|---|---|
| | | 100-200 | 200-300 | 300+ |
| Na₅P₃O₁₀ & Example A5 | .025 .025 | 86% | 12% | 1% |
| Na₅P₃O₁₀ & Example A4 | .025 .025 | 89% | 10% | 1% |
| Na₅P₃O₁₀ & Example A3 | .025 .025 | 89 | 8 | 3 |
| Na₅P₃O₁₀ & Example B1 | .025 .025 | 89 | 11 | 0 |
| Na₅P₃O₁₀ & Example A2 | .025 .025 | 99 | 1 | 0 |
| Example A2 | .05 | 94 | 5 | 1 |
| Na₅P₃O₁₀ & Example B3 | .025 .025 | 97 | 3 | 0 |
| Example B3 | .05 | 84 | 15 | 2 |
| Na₅P₃O₁₀ & Example B2 | .025 .025 | 96 | 4 | 0 |
| Example B2 | .05 | 91 | 9 | 0 |

The data from Table VI indicates that not all tetrafunctional diamines are effective when added in combination with Na₅P₃O₁₀. Only those with an ethylene oxide content of 10% to 20% by weight exhibit acceptable utility.

Table VI, below, shows data from tests conducted using other nonionic compounds in place of the tetrafunctional diamine.

TABLE VII

Efficacy of alternate nonionic compounds

| Composition | Concentration percent by weight | Particle Size (Microns) | | |
|---|---|---|---|---|
| | | 100-200 | 200-300 | 300+ |
| Na₅P₃O₁₀ & Example C1 | .025 .025 | 80% | 19% | 1% |
| Na₅P₃O₁₀ & Example C2 | .025 .025 | 82 | 15 | 3 |
| Na₅P₃O₁₀ & Example C3 | .025 .025 | 89 | 11 | 1 |
| Example C3 | .05 | 88 | 10 | 2 |
| Na₅P₃O₁₀ & Example C4 | .025 .025 | 86 | 14 | 1 |
| Example C4 | .05 | 86 | 12 | 1 |
| Na₅P₃O₁₀ & Example C5 | .025 .025 | 93 | 6 | 1 |
| Example C5 | .05 | 96 | 4 | 1 |

Example C1 ethyleneoxy propyleneoxy block copolymer, 30% by weight ethylene oxide.
Example C2 ethyleneoxy propyleneoxy block copolymer 80% by weight ethylene oxide.
Example C3 ethyleneoxy propyleneoxy block copolymer 10% by weight ethylene oxide.
Example C4 butoxy polypropyleneoxy polyethyleneoxy ethanol.
Example C5 Secondary alcohol ethoxylate.

The alternate nonionic compounds of Table VII also contain repeat units of ethylene oxide and propylene oxide. However, although similar to the tetrafunctional diamines, they do not perform in the same manner when combined with phosphate.

The tetrafunctional diamine component of the present invention may be effectively utilized with anionic species other than the phosphate shown in the test results above. These data are shown in Table VIII.

TABLE VIII

Alternate Anionics/Tetrafunctional Diamine Efficacy

| Composition | Concentration percent by weight | Particle Size (Microns) | | |
|---|---|---|---|---|
| | | 100–200 | 200–300 | 300+ |
| Example D1 & | .025 | 91% | 8% | 1% |
| Example A1 | .025 | | | |
| Example D2 & | .025 | 99 | 1 | 0 |
| Example A1 | .025 | | | |
| Example D2 | .05 | 92 | 8 | 1 |
| Example D3 & | .025 | 96 | 4 | 0 |
| Example A1 | .025 | | | |
| Example D3 | .05 | 89 | 10 | 1 |
| Example D4 & | .025 | 87 | 12 | 1 |
| Example A1 | .025 | | | |
| Example D4 | .05 | 79 | 18 | 2 |

Example D1 ethylene diamine tetra acetic acid
Example D2 hydroxyethylidene diphosphonate
Example D3 sodium salt of polyisopropenyl phosphonic acid
Example D4 sodium salt of sulfonated naphthalene-formaldehyde condensate The products which contain a phosphate functionality, hydroxyethylidene diphosphonate and the sodium salt of polyisopropenyl phos phonic acid, performed exceptionally well in combination with the tetrafunctional diamine. Accordingly, other phosphonates may be effectively utilized in accordance with this invention. Characteristic examples include amino trimethylene phosphonate, hexamethylene diamine tetramethylene phosphonate, ethylene diamine tetramethylene phosphonate and diethylene triamine pentamethylene phosphonate.

EXAMPLE 2

Coated publication paper from another paper manufacturer was used in these studies and will be referred to as "Coated Paper #2." This paper is made by an acid papermaking process. Coated Paper #2 contains a higher level of organic extractables (2.3%) than Coated Paper #1. These extractables contain a major component of SBR and minor components of PVAC, organic acids, and organic acid salts. The studies with this broke were carried out in the same manner as those in Example 1 except the particles were counted in slightly different particle size ranges (100–150, 150–200, 200–300, and 300 microns and greater). Once again particles less than 100 microns were not counted due to their high numbers.

TABLE IX

Coated Paper #2
Percent of Particles Greater than 100 Microns

| Compound | 100–150 | 100–200 | 200–300 | 300+ |
|---|---|---|---|---|
| No Additives | 77% | 15% | 6% | 2% |

Table X shows the effects of adding $Na_5P_3O_{10}$ and the tetrafunctional diamine of Example A1 either independently or in combination during the pulping of Coated Paper #2.

TABLE X $Na_5P_3O_{10}$/Tetrafunctional Diamine Efficacy

| Compound | Concentration Percent by Weight | Particle size (Microns) | | | |
|---|---|---|---|---|---|
| | | 100–150 | 150–200 | 200–300 | 300+ |
| $Na_5P_3O_{10}$ & | .025 | 90% | 9% | 1% | 0% |

TABLE X-continued $Na_5P_3O_{10}$/Tetrafunctional Diamine Efficacy

| Compound | Concentration Percent by Weight | Particle size (Microns) | | | |
|---|---|---|---|---|---|
| | | 100–150 | 150–200 | 200–300 | 300+ |
| Example A1 | .025 | | | | |
| $N_5P_3O_{10}$ | .05 | 80 | 17 | 3 | 0 |
| Example A1 | .05 | 80 | 12 | 9 | 0 |

Even though this coated broke is different than Coated Paper #1, in both cases the combination of $Na_5P_3O_{10}$ and the tetrafunctional diamine, example A1, produced fewer large particles than when each component was added separately.

As in Example #1, paper was made from Coated Paper #2 which had been repulped with increasing quantities of the $Na_5O_3O_{10}$Example A1 combination. The amount of force required to separate foil and paper, which had been dried together, was measured and is indicative of the deposition potential in the dryer section of the paper machine (the higher the peel force the greater the deposition potential). The results are presented in Table XI.

TABLE XI

Peel Strength

| Compound | Concentration Percent by Weight | Peel Strength (g/cm width) |
|---|---|---|
| No Additives | — | 22.6 |
| $Na_5P_3O_{10}$ & Example A1 | .00625 .00625 | 19.9 |
| $Na_5P_3O_{10}$ & Example 1 | .0125 .0125 | 18.1 |
| $Na_5P_3O_{10}$ & Example A1 | .025 .025 | 15.5 |
| $Na_5P_3O_{10}$ & Example A1 | .05 .05 | 13.9 |

As also seen in example #1, increasing dosages of the tetrafunctional diamine/$Na_5P_3O_{10}$ combination caused a proportional continuing decrease in the deposition potential of the repulped Coated Paper #2 as measured by peel strength.

Coated Paper #2 as measured by peel strength.

Coated Paper #2 was pulped with the tetrafunctional diamine Example A1 and various phosphonates. The results are shown in Table XII.

TABLE XII

Phosphonates/Tetrafunctional Diamine Efficacy

| Compound | Concentration Percent by Weight | Particle size (Microns) | | | |
|---|---|---|---|---|---|
| | | 100–150 | 150–200 | 200–300 | 300+ |
| Example E1 & Example A1 | .025 .025 | too few particles greater than 100 microns | | | |
| Example E2 & Example A1 | .025 .025 | too few particles greater than 100 microns | | | |
| Example E3 & Example A1 | .025 .025 | too few particles greater than 100 microns | | | |
| Example E2 & Example A1 | .00625 .00625 | 89% | 8% | 4% | 0% |
| Example A1 | .0125 | 80 | 13 | 4 | 2 |
| Example E2 | .0125 | 83 | 12 | 4 | 2 |
| Example E3 & Example A1 | .00625 .00625 | 89 | 6 | 4 | 2 |

TABLE XII-continued

| | Phosphonates/Tetrafunctional Diamine Efficacy | | | | |
|---|---|---|---|---|---|
| | Concentration | Particle size (Microns) | | | |
| Compound | Percent by Weight | 100–150 | 150–200 | 200–300 | 300+ |
| Example E3 | .0125 | 84 | 14 | 2 | 1 |

Example E1 amino trimethylene phosphonic acid
Example E2 1-hydroxyethylidene 1,1-diphosphonic acid
Example E3 ethylene diamine tetramethylene phosphonic acid The phosphonate/tetrafunctional diamine combinations proved to be much more effective than the $Na_5P_3O_{10}$/tetrafunctional diamine combinations on reducing particle size in the pulped Coated Paper #2. In fact, the treatment concentration level needed to be reduced in order find a sufficient number of particles larger than 100 microns.

The deposition potential of Coated Paper #2 when repulped with 1 hydroxyethylidene 1,1-diphosphonic acid/tetrafunctional diamine was evaluated in accordance with the procedure previously described. Results are shown in Table XIII.

TABLE XIII

| | Peel Strength | |
|---|---|---|
| Compound | Concentration Percent by Weight | Peel Strength (g/cm width) |
| No Additives | — | 25.7 |
| Example E2 & | .0025 | 24.3 |
| Example A1 | .0025 | |
| Example E2 & | .00625 | 21.0 |
| Example A1 | .00625 | |
| Example E2 & | .0125 | 17.5 |
| Example A1 | .0125 | |
| Example E2 & | .025 | 14.1 |
| Example A1 | .025 | |

The deposition potential of Coated Paper #2 decreased with increasing concentrations of the phosphonate/tetrafunctional diamine compound. This correlates with a corresponding particle size reduction with increasing concentrations of the compound.

Other anionic species were tested for particle size reduction efficacy in coated Paper #2 along with the tetrafunctional diamine. These results are shown in Table XIV.

TABLE XIV

| | Alternate Anionic/Tetrafunctional Diamine Efficacy | | | | |
|---|---|---|---|---|---|
| | Concentration | Particle size (Microns) | | | |
| Compound | Percent by Weight | 100–150 | 150–200 | 200–300 | 300+ |
| Example F1 & | .025 | 82% | 11% | 5% | 1% |
| Example A1 | .025 | | | | |
| Example F1 | .05 | 83 | 11 | 2 | 4 |
| Example F2 & | .025 | 92 | 7 | 1 | 0 |
| Example A1 | .025 | | | | |
| Example F2 | .05 | 84 | 10 | 4 | 1 |
| Example F3 & | .025 | 83 | 14 | 3 | 0 |
| Example A1 | .025 | | | | |
| Example F3 | .05 | 82 | 13 | 4 | 1 |
| Example F4 & | .025 | 79 | 18 | 2 | 2 |
| Example A1 | .025 | | | | |
| Example F4 | .05 | 75 | 18 | 5 | 2 |

Example F1 polyacrylic acid
Example F2 polyisopropenyl phosphonic acid
Example F3 polyoxyethylene nonyl phenyl phosphate ester
Example F4 polyoxyethylene octadecenyl phosphate ester The only effective combination shown above was the tetrafunctional diamine with the phosphonic acid, Example F2. These results correspond with the testing conducted on Coated Paper #1. The cumulative data from Example #1 and Example #2 support the finding that any phosphate functionality will act synergistically with tetrafunctional diamines to effectively redisperse the latex coating in the smallest particles possible during repulping of recycled coated paper.

As in Example #1. $Na_5O_3O_{10}$ was combined with other nonionic surfactants. The results are shown in Table XV.

TABLE XV

| | $Na_5P_3O_{10}$/Alternate Nonionic Surfactant Efficacy | | | | |
|---|---|---|---|---|---|
| | Concentration | Particle size (Microns) | | | |
| Compound | Percent by Weight | 100–150 | 150–200 | 200–300 | 300+ |
| $Na_5P_3O_{10}$ & | .025 | 88% | 10% | 2% | 0% |
| Example C5 | .025 | | | | |
| Example C5 | .05 | 90 | 9 | 1 | 1 |
| $N_5P_3O_{10}$ & | .025 | 90 | 6 | 2 | 1 |
| Example C3 | .025 | | | | |
| Example C3 | .05 | 82 | 10 | 4 | 4 |

Example C5 secondary alcohol ethoxylate
Example C3 ethyleneoxy propyleneoxy block copolymer, with 10% by weight of ethylene oxide.

Neither the alcohol ethoxylate nor the block copolymer performed effectively with the phosphate to reduce particle size. These results correlate with findings under Example #1.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for minimizing the deposition of white pitch on papermaking equipment so as to reduce paper sheet defects by treating coated broke in a papermill having a repulping operation comprising adding to said coated broke within said repulping operation a composition comprising a first compound of a tetrafunctional alkoxylated diamine having the formula:

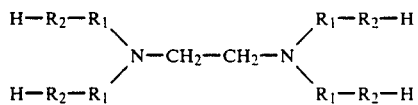

wherein $R_1$ and $R_2$ are selected from the group consisting of ethylene oxide and propylene oxide and $R_1$ and $R_2$ are not the same, and a second compound selected from the group consisting of a phosphate and a phosphonic acid or salt thereof, wherein said first and second compounds are added in an amount effective to minimize said white pitch deposition.

2. A method according to claim 1 wherein said coated broke contains one or more elements selected from the group consisting of styrene butadiene and polyvinyl acetate.

3. A method according to claim 1 wherein the ethylene oxide content of said tetrafunctional alkoxylated diamine is from about 10% to about 80% by weight.

4. A method according to claim 1 wherein the ethylene oxide content of said tetrafunctional alkoxylated diamine is from about 10% to about 20% by weight.

5. A method according to claim 1 wherein said phosphate is selected from the group consisting of $Na_5P_3O_{10}$, $(NaPO_3)_{21}$, polyoxyethylene nonyl phenyl ether phosphate and polyoxyethylene octadecenyl ether phosphate.

6. A method according to claim 1 wherein said phosphonic acid or salt thereof is selected from the group consisting of amino trimethylene phosphonate, hexamethylene diamine tetramethylene phosphonate, ethylene diamine tetramethylene phosphonate, diethylene triamine penta methylene phosphonate, 1-hydroxyethylidene 1,1-diphosphonic acid, ethylene diamine tetramethylene phosphonic acid and polyisopropenyl phosphonic acid.

7. A method according to claim 1 wherein the weight ratio of said tetrafunctional alkoxylated diamine to said second compound is from about 1:4 to about 4:1.

8. A method according to claim 7 wherein said weight ratio is about 1:1.

9. A method according to claim 1 wherein said composition is utilized in conjunction with one or more additive(s) selected from the group consisting of retention aids, felt conditioners and pitch control agents.

* * * * *

UNITED STATES PATENT AND TRADEMARK OFFICE
CERTIFICATE OF CORRECTION

PATENT NO. : 4,997,523

DATED : March 5, 1991

INVENTOR(S) : J. K. Pease et al

It is certified that error appears in the above-identified patent and that said Letters Patent is hereby corrected as shown below:

On the title page, item [73] Assignee: please change the name to read --Betz PaperChem, Inc.--.

Signed and Sealed this

Sixth Day of October, 1992

Attest:

DOUGLAS B. COMER

*Attesting Officer*  *Acting Commissioner of Patents and Trademarks*